(No Model.)
J. BRADLEY.
ROLLER BEARING FOR AXLES OF VEHICLES.
No. 567,451. Patented Sept. 8, 1896.
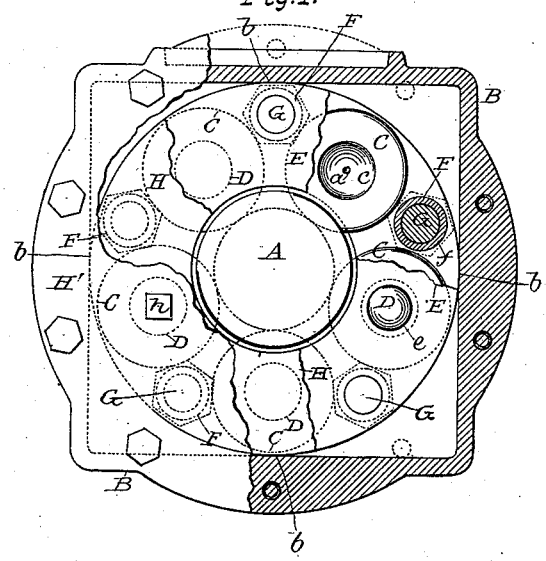
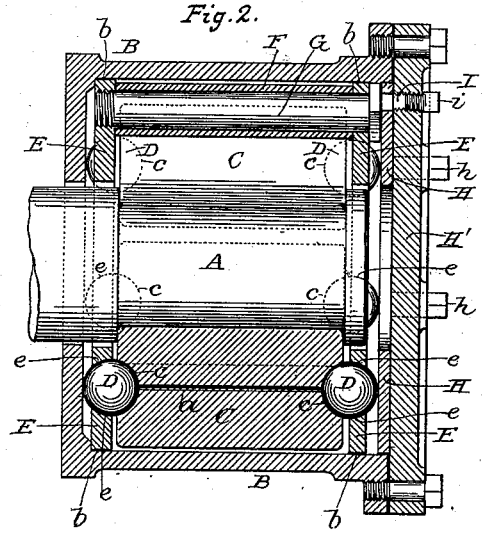
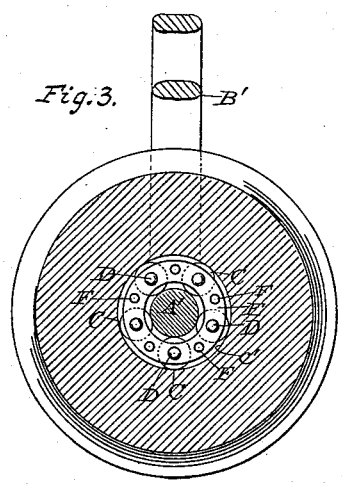
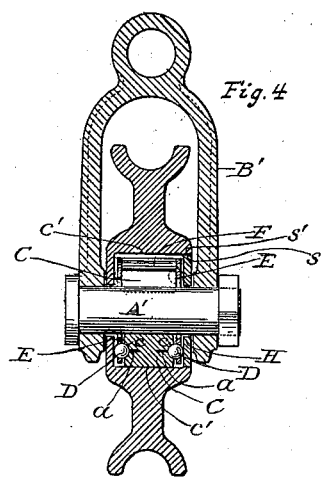
Witnesses.
James Bradley
*Inventor.*
by Alex. Selkirk
*Attorney.*

UNITED STATES PATENT OFFICE.

JAMES BRADLEY, OF NIVERVILLE, NEW YORK, ASSIGNOR TO ANNA BRADLEY, OF SAME PLACE.

ROLLER-BEARING FOR AXLES OF VEHICLES.

SPECIFICATION forming part of Letters Patent No. 567,451, dated September 8, 1896.

Application filed November 20, 1895. Serial No. 569,482. (No model.)

*To all whom it may concern:*

Be it known that I, JAMES BRADLEY, a citizen of the United States, residing at Niverville, in the county of Columbia and State of New York, have invented new and useful Improvements in Roller-Bearings, of which the following is a specification.

My invention relates to roller-bearings for axles of wheels of vehicles, &c.; and it consists of the combinations of devices and elements hereinafter described, and set forth in the claim.

The objects of my invention are to provide with an axle of a wheel a series of rollers for bearings on the periphery of the former, two series of balls for central supports to the ends of said rollers, bearing-plates at the opposite ends of the series of rollers and provided with bearings for receiving portions of said balls, and mechanisms for setting at will the balls up to the central end bearings of the said rollers, whereby the axle may be run on roller-bearings which are themselves run on ball-centers that are readily adjustable at will for taking up any wear that may occur by use of the wheel provided with the improvements in this invention. I attain these objects by the means illustrated in the accompanying drawings, forming a part of this specification, and in which—

Figure 1 is an end view of a housing of a car-axle with parts broken away for exposing hidden parts and elements employed in this invention. Fig. 2 is a longitudinal section of the same, illustrating a car-axle journal having the improvements in this invention applied thereto. Fig. 3 is a sectional view of a sheave embodying my invention; and Fig. 4 is a sectional view, taken in the transverse, of the same.

The same letters of reference refer to similar parts throughout the several views.

In the drawings, A, Figs. 1 and 2, is a journal of a car-axle, and B is the housing of the same, which housing may be held with the frame (not shown) of the car-truck by any suitable pedestal or other known means now employed for that purpose.

A', Figs. 3 and 4, is the journal of a sheave-wheel of a pulley, and B' is the strap supporting the said journal of the said wheel.

C C C are rollers which may be employed in numbers of three or more with the journal A or A', with which they are to operate as roller-bearings. These rollers are preferably of hardened steel of like diameters and finished with uniformly true and polished peripheral surfaces for bearing on the peripheral surface of the said journal. The ends of these rollers are longitudinally pierced by central perforations $a$, which perforations are preferably extended centrally through the said rollers from end to end, as shown in Fig. 2, for service, first, as coincident centers to the rollers when being turned, and, second, for leading the wear of their respective end bearings $c$ in a true central line, so as to maintain said bearings during all their wear centrally in said rollers. These rollers C C are each provided with end bearings $c\ c$ of spherical form of cavity, which have their centers on coincident axial lines corresponding with the axial lines of said rollers and the central perforations $a$ of the same.

D D are balls of diameter corresponding with that on which the spherical end bearings $c\ c$ of the rollers C C are formed. These balls are preferably of hardened steel and are each received in an end bearing $c$ of each roller and serve as ball-form centers on which said rollers may freely revolve.

E E are ball-bearing plates of steel, preferably, and are made with any preferred suitable form and have, respectively, in them concavo bearings $e\ e$, in number corresponding with the number of balls D each are to support, of curvature corresponding with that of said balls, and with the centers of these concavo bearings in each plate E coincident in relation to the centers of those of the coacting plate also supporting similar and coacting balls. These bearings $e\ e$ nicely fit and receive suitable portions of these balls for which they are to serve as bearings.

The balls D extend through the bearing-plates E, and one series bears against the inner wall of a suitable housing or casing while the other series bears against the follower H, which follower is adjustable and thereby enables the several parts constituting the bearing to be moved laterally, so as to take up any wear between the bearing-balls and the rollers and between the bearing-balls and the sides of the casing or housing in which the bearing is supported. The bearing-balls by extending through the bearing-plates E bear against the sides of the housing and adjustable follower at single points on their surfaces and produce but little or no friction as the bearing revolves in the casing or housing.

F F are tubular supports to the ball-bearing plates E E, between which they intervene for holding said plates at a uniformly given distance apart. These supports F are preferably employed in number corresponding with the number of ball-bearings $e\ e$ provided in said plates and are preferably at equal distance from each other and between each two bearings $e\ e$ in each said plates, as shown by full and dotted lines in Fig. 1.

In practice each ball-bearing plate E is truly dressed on both sides and their outer edges in a suitable lathe, and the tubular supports F are each made with a suitable and uniform length with their ends truly dressed for equal bearing on the trued side surfaces of said plates E, with which they are securely held by bolts G G, (shown by full and dotted lines in Figs. 1 and 2,) which nicely fit both the perforations $f$, made in plates E, and the bores of the tubular supports F. When these plates E and tubular supports F are secured together by said bolts G, they constitute a strong frame for supporting the balls D D. This frame operates as a means for holding the balls in place in the end bearings $c\ c$ of the rollers C. In some cases, as when this invention is to be employed with the journals of car-axles and a housing of the same, I provide in the housing B suitable seats, as $b\ b$, truly dressed, so as to nicely receive the outer edges of the ball-bearing plates E, each at three or more places of contact, for holding with the housing for preventing them from shifting in any direction. In cases where the journal is supported from both ends and the wheel to be revolved is loose, so as to revolve independently of the journal, these ball-bearing plates E need not have contact with the sides of the chamber within which this frame with its rollers and balls are contained, so that while the rollers C C have bearing against the journal A they will also have bearing against the inner surface $c'$ of the bore of the wheel, as shown in Figs. 3 and 4.

H is a movable follower which is adapted to be forced inwardly toward the ends of the rollers C opposite, to have bearing on the outer crowns of the balls D, so as to hold them nicely fitting in the bearings $c\ c$ in the ends of the rollers. This follower H may be moved inwardly by means of set-screws $h\ h$, screwing into an outer stationary plate H', Figs. 1 and 2, or by means of screw-threads $s$, provided on the outer circumference of the follower and working in coacting screw-threads $s'$, provided in the wall of the chamber receiving the rollers and their adjuncts. The bearings $c$ in the ends of the rollers C and the balls D, being of hardened steel and smoothly finished and freely lubricated, will be attended by but a very small degree of wear, so that a great length of time of service will be had in all cases before a setting inwardly of the follower H will be required.

I is a suitable perforation for use for introduction of a suitable lubricating liquid to within the chamber of the housing, which perforation may be closed by a suitable plug $i$, either plain or screw-threaded, as may be preferred.

Although a single set of rollers, balls, bearing-plates, and their adjuncts, as above described, are shown to be employed, yet in cases where the axle is fixed to the hub of the wheel, so as to revolve with it, with the journals projecting outwardly for a holding with housings and bearing connected with frame-pieces, as in bicycles, I in such cases duplicate the above-described arrangement of rollers C, balls D, ball-bearing plates E, movable follower H, and the adjuncts and elements above described, and arrange one set of said elements and devices at each end of the hub of the wheel and within a suitable chamber formed in each end of the hub for receiving the same, or within suitable chambers within housings connected with the frame of the vehicle, when the same advantageous results will be secured.

Having described my invention, what I claim, and desire to secure by Letters Patent, is—

In a roller-bearing, the combination with a suitable casing or housing, of a series of rollers having centrally concave ends, ball-bearing plates arranged opposite the ends of said rollers and provided with concave perforations in line with the axis of each of said rollers, bearing-balls arranged between the concave ends of said rollers and perforations of said plates so as to project beyond the sides of said plates, and an adjustable follower bearing against the projecting portions of said balls, substantially as shown and described.

JAMES BRADLEY.

Witnesses:
ALEX. SELKIRK,
A. SELKIRK, JR.